(12) United States Patent
Sherrit et al.

(10) Patent No.: US 9,605,771 B2
(45) Date of Patent: Mar. 28, 2017

(54) FLOW CAGE ASSEMBLIES

(71) Applicant: California Institute of Technology, Pasadena, CA (US)

(72) Inventors: Stewart Sherrit, La Crescenta, CA (US); Mircea Badescu, La Canada Flintridge, CA (US); Xiaoqi Bao, San Gabriel, CA (US); Yoseph Bar-Cohen, Seal Beach, CA (US)

(73) Assignee: California Institute of Technology, Pasadena, CA (US)

( * ) Notice: Subject to any disclaimer, the term of this patent is extended or adjusted under 35 U.S.C. 154(b) by 106 days.

(21) Appl. No.: 14/308,374

(22) Filed: Jun. 18, 2014

(65) Prior Publication Data

US 2014/0374631 A1    Dec. 25, 2014

Related U.S. Application Data (60) Provisional application No. 61/837,044, filed on Jun. 19, 2013.

(51) Int. Cl.
*F16K 47/08*    (2006.01)
*F15D 1/02*    (2006.01)
*F16L 55/027*    (2006.01)

(52) U.S. Cl.
CPC .............. *F16K 47/08* (2013.01); *F15D 1/025* (2013.01); *F16L 55/0279* (2013.01);
(Continued)

(58) Field of Classification Search
CPC ........ F16K 47/08; F16K 47/04; F16L 37/091; F16L 21/03; F16L 37/0845; F16L 47/08;
(Continued)

(56) References Cited

U.S. PATENT DOCUMENTS 4,860,993 A * 8/1989 Goode .................... F16K 47/08
                                                                 137/625.3
5,390,896 A    2/1995 Smirl
(Continued)

FOREIGN PATENT DOCUMENTS

| KR | 101266961 B1 | 5/2013 |
|---|---|---|
| WO | 2012165677 A1 | 12/2012 |
| WO | 2014205099 A1 | 12/2014 |

OTHER PUBLICATIONS

International Search Report and Written Opinion for International Application PCT/US2014/042984, completed Oct. 14, 2014, Mailed Oct. 14, 2014, 11 Pgs.
(Continued)

*Primary Examiner* — Michael R Reid
(74) *Attorney, Agent, or Firm* — KPPB LLP (57) ABSTRACT

Apparatus, systems and methods for implementing flow cages and flow cage assemblies in association with high pressure fluid flows and fluid valves are provided. Flow cages and flow assemblies are provided to dissipate the energy of a fluid flow, such as by reducing fluid flow pressure and/or fluid flow velocity. In some embodiments the dissipation of the fluid flow energy is adapted to reduce erosion, such as from high-pressure jet flows, to reduce cavitation, such as by controllably increasing the flow area, and/or to reduce valve noise associated with pressure surge.

15 Claims, 11 Drawing Sheets

(52) U.S. Cl.
CPC ... *F16L 55/02718* (2013.01); *F16L 55/02727* (2013.01); *F16L 55/02736* (2013.01); *F16L 55/02781* (2013.01); *Y10T 137/206* (2015.04)

(58) Field of Classification Search
CPC .............. F16L 17/035; F16L 55/0279; F16L 55/02727; F15D 1/025; Y10T 137/86718; Y10T 137/86734; Y10T 137/86759; Y10T 137/86767; Y10T 137/86775; Y10T 137/86791; Y10T 137/86799; Y10T 137/86807
USPC .............. 137/625.28, 625.3, 625.33, 625.34, 137/625.35, 625.37, 625.38, 625.39, 803, 137/206; 251/118; 138/40–46
See application file for complete search history.

(56) References Cited

U.S. PATENT DOCUMENTS

| | | | |
|---|---|---|---|
| 5,941,281 A | 8/1999 | Baumann et al. | |
| 6,161,584 A * | 12/2000 | Hemme .................. | F16K 47/08 137/625.3 |
| 7,089,961 B2 * | 8/2006 | Morton .................. | F16K 47/08 137/625.3 |
| 2005/0199298 A1 | 9/2005 | Farrington | |
| 2006/0207666 A1 * | 9/2006 | Micheel .................. | F16K 3/246 137/625.3 |

OTHER PUBLICATIONS

International Preliminary Report on Patentability for International Application PCT/US2014/042984, Report issued Dec. 22, 2015, Mailed Dec. 30, 2015, 9 Pgs.

* cited by examiner

FLOW CAGE ASSEMBLIES

CROSS-REFERENCE TO RELATED APPLICATIONS

This application claims priority to U.S. Provisional Patent Application No. 61/837,044, filed Jun. 19, 2013, the disclosure of which is incorporated herein by reference.

STATEMENT OF FEDERAL FUNDING

The invention described herein was made in the performance of work under a NASA contract, and is subject to the provisions of Public Law 96-517 (35 USC 202) in which the Contractor has elected to retain title.

TECHNICAL FIELD

The present disclosure is directed to flow cages and flow cage assemblies; and more particularly to energy dissipating flow cages and flow cage assemblies for use in high pressure valves to prevent fluid control problems, such as, for example, jet erosion, cavitation, fluid surge, or the generation of noise in the system components.

BACKGROUND OF THE DISCLOSURE

A number of challenges can arise in engineering valves capable of withstanding flow conditions where high pressure differentials or other difficult flow conditions such as cavitation or high fluid velocity are found. In particular, during actuation of such valves, that is shutting off or on fluid flow, the valve can experience large forces which, can lead to fluid control problems such as, for example, excessive noise in the fluid flow, cavitation, large pressure surges, the creation of high pressure jets within the fluid flow, severe erosion, vibration, seat leakage, poor flow control and early break down of the valve.

In general, fluid control problems capable of generating forces high enough to disrupt valve operation and/or damage the valve arise where there is a high pressure differential experienced by the valve. Under such conditions it is much more likely that fluid control problems might arise, such as, for example, cavitation, surge and flow erosion, particularly during actuation of the valve. Examples of industries where such high flow conditions are common include, for example, gas handling for pressurized tanks, valving for engine combustion chambers, valves for use in oil or gas drilling, and fluid handling in other high pressure or flow applications such as, for example, power plants.

SUMMARY OF THE INVENTION

The present disclosure provides embodiments directed to systems and methods for implementing energy dissipating cages for use in conjunction with high pressure valves.

In many embodiments the systems and methods are directed to flow cage assemblies including:
  at least one flow cage body, each at least one flow cage body having at least one inlet and at least one outlet, and defining at least one flow path therebetween, such that there is fluid communication through said flow cage body through the at least one flow path;
  wherein each of the at least one inlets defines a first fluid flow direction and each of the at least one outlets defines a second fluid flow direction, and each of the at least one flow paths is configured to redirect an incoming fluid flow in at least one redirected fluid flow direction that is angled to the first fluid flow direction at least once prior to interconnecting said incoming fluid flow to the outlet; and
  wherein the flow path is formed from at least one of the following, a single path channel or an array of angular body flow features.

In other embodiments the flow cage body is one of either planar or non-planar.

In still other embodiments the first fluid flow direction is radial and wherein the redirected fluid flow direction is azimuthal.

In yet other embodiments the second fluid flow direction is the same as the first fluid flow direction.

In still yet other embodiments the flow path follows the redirected fluid flow direction at least twice before interconnecting the incoming fluid flow to the outlet.

In still yet other embodiments the systems and methods further include at least two inlets and two outlets, wherein each inlet is interconnected to a single outlet via a separate flow path.

In still yet other embodiments the systems and methods further include at least two inlets and two outlets, wherein each inlet is interconnected to a plurality of outlets.

In still yet other embodiments the systems and methods further include at least two flow cage bodies, the flow cage bodies being cooperatively stackable.

In still yet other embodiments the flow area of the at least one flow path is one of either constricted or dilated between the at least one inlet and the at least one outlet.

In still yet other embodiments the angular body flow features having shapes having a plurality of faces and vertices selected from the group consisting of quadrilaterals, triangles, hexagons, and octagons.

In still yet other embodiments the angular body flow features have rounded corners In many other embodiments the systems and methods are directed to a flow cage assembly including:
  at least one flow cage body, each at least one flow cage body having at least one inlet and at least one outlet, and defining at least one flow path there between, such that there is fluid communication through said flow cage body through the at least one flow path;
  wherein each of the at least one inlets defines a first fluid flow direction and each of the at least one outlets defines a second fluid flow direction, and each of the at least one flow paths is configured to redirect an incoming fluid flow in at least one redirected fluid flow direction that is angled to the first fluid flow direction at least once prior to interconnecting said incoming fluid flow to the outlet; and
  wherein the at least one flow cage body and the at least one flow path are non-planar.

In other embodiments the fluid flow is redirected at least in a redirected fluid flow direction that is out-of-plane with the first fluid flow direction.

In still other embodiments the flow path redirects the fluid flow at least in a first redirected fluid flow direction that is in-plane with the first fluid flow direction and in a second redirected fluid flow direction that is out-of-plane with the first fluid flow direction before interconnecting the incoming fluid flow to the outlet.

In still yet other embodiments the second fluid flow direction is in-line with an external fluid flow into which the at least one outlet communicates.

In still yet other embodiments the second fluid flow direction is counter to an external fluid flow into which the at least one outlet communicates.

In still yet other embodiments the systems and methods further include at least two inlets and two outlets, wherein each inlet is interconnected to a single outlet via a separate flow path.

In still yet other embodiments the systems and methods further include at least two inlets and two outlets, wherein each inlet is interconnected to a plurality of outlets.

In still yet other embodiments the systems and methods further include at least two flow cage bodies, the flow cage bodies being cooperatively stackable.

In still yet other embodiments the flow area of the at least one flow path is one of either constricted or dilated between the at least one inlet and the at least one outlet.

In still yet other embodiments the flow path is formed from at least one of the following, a single path channel or an array of angular body flow features, the angular body flow features having shapes having a plurality of faces and vertices selected from the group consisting of quadrilaterals, triangles, hexagons, and octagons.

In still many other embodiments the systems and methods are directed to a valve including:
 a valve body having a valve inlet in fluid communication with a first external fluid passage and a valve outlet in fluid communication with a second external fluid passage and a valve gate disposed therebetween for opening and closing the fluid communication therebetween;
 at least one flow cage assembly disposed in fluid communication with said valve body, the flow cage assembly comprising at least one flow cage body, each at least one flow cage body having at least one inlet in fluid communication with the valve gate and at least one outlet in fluid communication with the valve outlet, the flow cage body further defining at least one flow path between said at least one inlet and at least one outlet, the at least one flow path formed from at least one of the following, a single path channel or an array of angular body flow features; and
 wherein each of the at least one inlets defines a first fluid flow direction and each of the at least one outlets defines a second fluid flow direction, and each of the at least one flow paths is configured to redirect an incoming fluid flow in at least one redirected fluid flow direction that is angled to the first fluid flow direction at least once prior to interconnecting said incoming fluid flow to the outlet.

In still yet other embodiments the flow cage body is planar and the first fluid flow direction is radial and wherein the redirected fluid flow direction is azimuthal.

In still yet other embodiments the flow cage assembly comprises at least two flow cage bodies, the flow cage bodies being cooperatively stackable.

In still yet other embodiments the flow area of the at least one flow path is one of either constricted or dilated between the at least one inlet and the at least one outlet.

In yet many other embodiments the systems and methods are directed to a valve comprising:
 a valve body having a valve inlet in fluid communication with a first external fluid passage and a valve outlet in fluid communication with a second external fluid passage and a valve gate disposed therebetween for opening and closing the fluid communication therebetween;
 at least one flow cage assembly disposed in fluid communication with said valve body, the flow cage assembly comprising at least one flow cage body, each at least one flow cage body having at least one inlet in fluid communication with the valve gate and at least one outlet in fluid communication with the valve outlet, the flow cage body further defining at least one flow path between said at least one inlet and at least one outlet;
 wherein each of the at least one inlets defines a first fluid flow direction and each of the at least one outlets defines a second fluid flow direction, and each of the at least one flow paths is configured to redirect an incoming fluid flow in at least one redirected fluid flow direction that is angled to the first fluid flow direction at least once prior to interconnecting said incoming fluid flow to the outlet; and
 wherein the at least one flow cage body and the at least one flow path are non-planar.

In other embodiments the fluid flow is redirected at least in a redirected fluid flow direction that is out-of-plane with the first fluid flow direction.

In still other embodiments the flow path redirects the fluid flow at least in a first redirected fluid flow direction that is in-plane with the first fluid flow direction and in a second redirected fluid flow direction that is out-of-plane with the first fluid flow direction before interconnecting the incoming fluid flow to the outlet.

In yet other embodiments the second fluid flow direction is in-line with the fluid flow direction in the second external fluid passage.

In still yet other embodiments the second fluid flow direction is counter to the fluid flow direction in the second external fluid passage.

In still yet other embodiments the flow cage assembly comprises at least two flow cage bodies, the flow cage bodies being cooperatively stackable.

In still yet other embodiments the flow area of the at least one flow path is one of either constricted or dilated between the at least one inlet and the at least one outlet.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

In accordance with the provided disclosure and drawings, apparatus, systems and methods for implementing flow cages and flow cage assemblies in association with high pressure fluid flows and fluid valves are provided. In many embodiments flow cages and flow assemblies are provided to dissipate the energy of a fluid flow, such as by reducing fluid flow pressure and/or fluid flow velocity. In some embodiments the dissipation of the fluid flow energy is adapted to reduce erosion, such as from high pressure jet flows, to reduce cavitation, such as by controllably increasing the flow area, and/or to reduce valve noise associated with pressure surge.

As will be described in greater detail below, in many embodiments such flow cages and flow cage assemblies generally comprise one or more flow cage bodies having at least one inlet and at least one outlet and a fluid path disposed therebetween. The flow cage bodies may be planar or non-planar, and in many embodiments are adapted to be cooperatively stacked to allow for control of the total fluid volume that can pass through the flow cage assembly. The fluid path in such flow cage bodies generally comprise one or more contiguous fluid channels or one or more multi-path fluid channels formed from an array of flow features. In many embodiments the flow path and/or flow features are configured to control some aspect of the fluid flow passing through the flow cage/flow cage assembly by varying the pressure, direction and/or velocity of the fluid flow, such as by forming fluid paths having one or more directions (i.e., azimuthal, radial and axial), by impinging fluid flow, by constricting or dilating the flow area within the fluid flow path, by redirecting fluid flow counter and/or in-line with a main flow, by introducing non-planar flow to the fluid path, and by increase the length of the fluid travel between the inlet and outlet of the valve cage. In many embodiments these fluid control variables may be configured by adjusting one or more elements of the fluid path, including, for example, the width of the channels, the number of channels, the extent of angular redirection introduced individually and collectively by the flow features within the flow path, by altering the alignment of the inlet and outlet openings or the openings between flow features relative to each other, by configuring the non-planar geometries of the flow cage bodies, by varying the shape and geometry of the flow elements making up a the flow path, and/or by engineering the direction of the outlet flow relative to the inlet flow.

Figure 1:
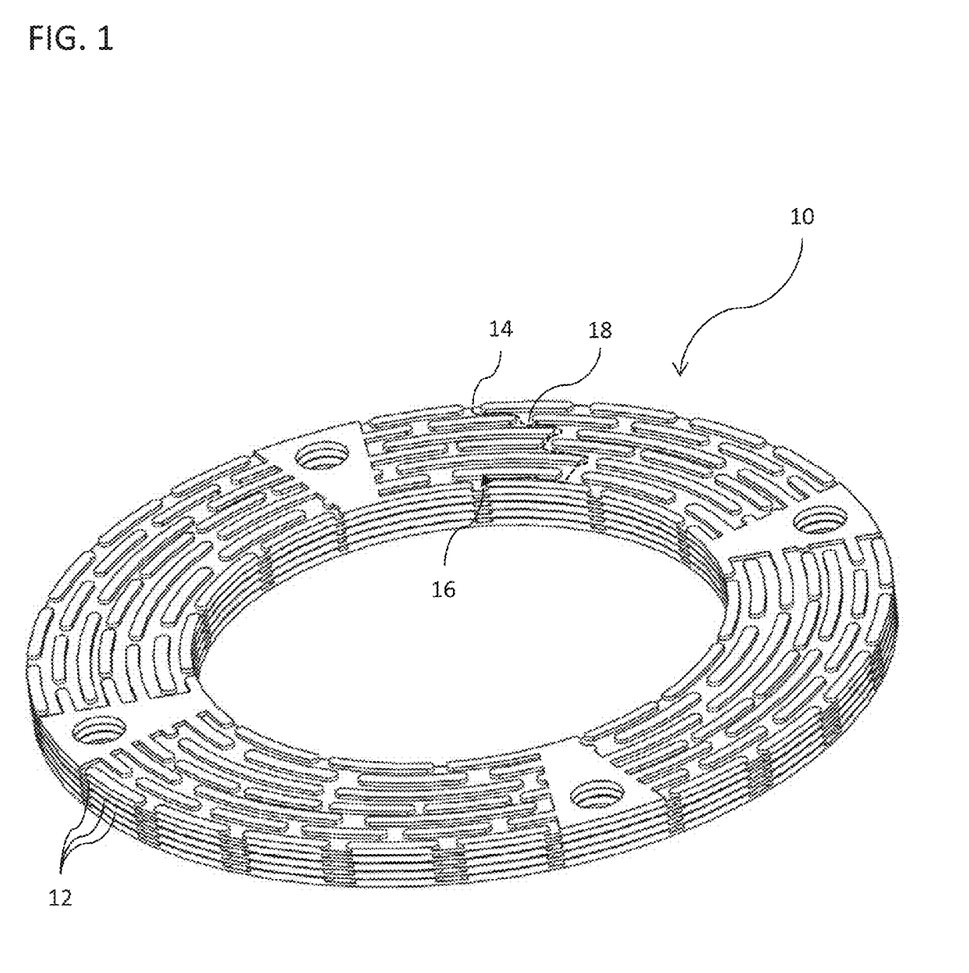
FIG. 1 provides a schematic diagram of a flow cage assembly in accordance with embodiments of the invention.

As shown in FIG. 1, a flow cage assembly (10) in accordance with many embodiments of the invention generally comprises one or more flow cage bodies (12), each flow cage body having at least one inlet (14) and one outlet (16) and a fluid flow path (18) disposed therebetween and allowing for fluid communication between the inlet and outlet (as shown by the dashed arrow). (Note it should be understood that though one portion is labeled an inlet and another the outlet that these could be reversed without modifying the principals described.)

Although the embodiment shown in FIG. 1 shows a particular number of stacked flow cage bodies, it will be understood that any number of such flow cage bodies may be cooperatively arranged to provide the necessary flow volume, with each additional flow cage body providing additional potential flow volume between the inlet and outlet sides of the flow cage assembly. In addition, although a flow cage assembly and flow cage bodies having a generally cylindrical configuration are provided in the pictured embodiment, it will be understood that other fluid cage body cross-sections (e.g., hexagonal, octagonal, square, circular, etc.) may be provided such that the fluid cage assembly is adapted for use with a particular main fluid channel or fluid valve system.

Figure 2A:
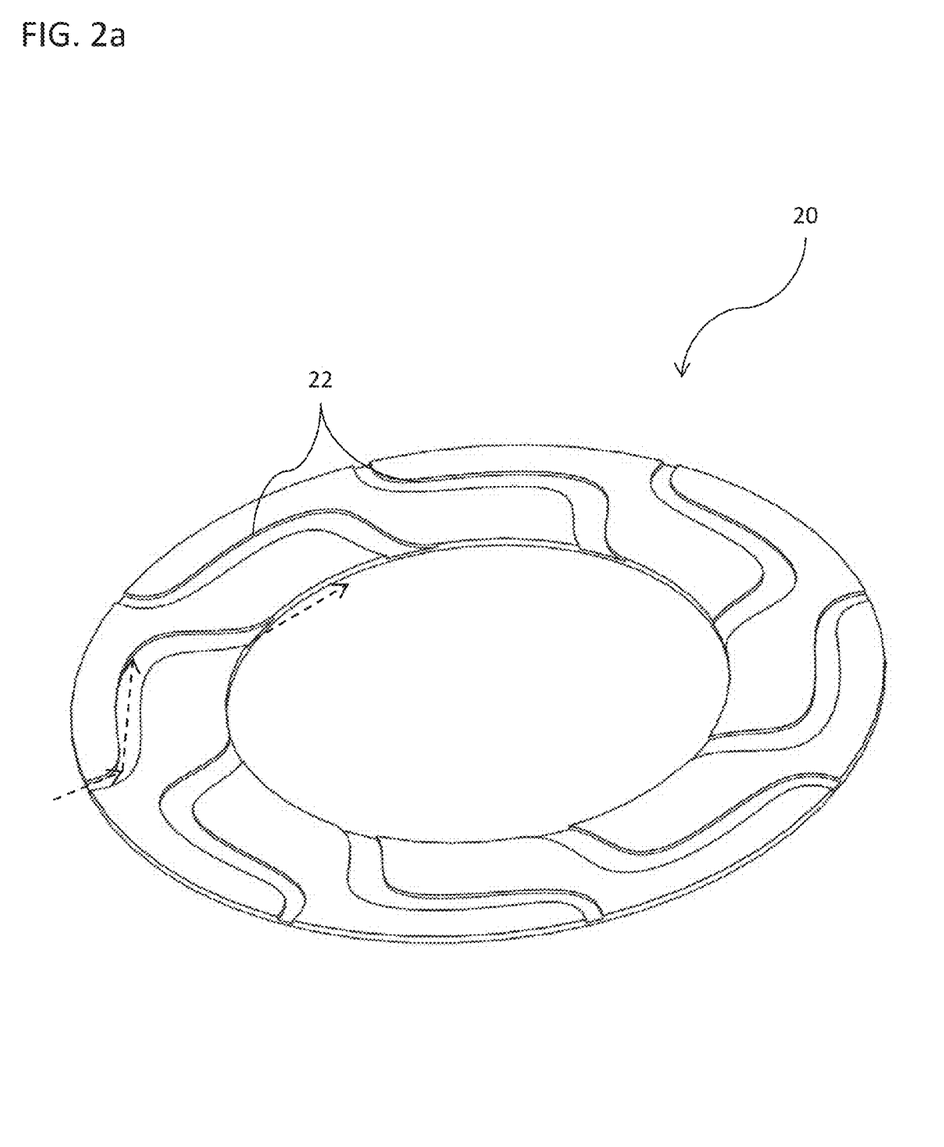
FIGS. 2a to 2d provide schematic diagrams of flow cage bodies in accordance with some embodiments of the invention.
Figure 2B:
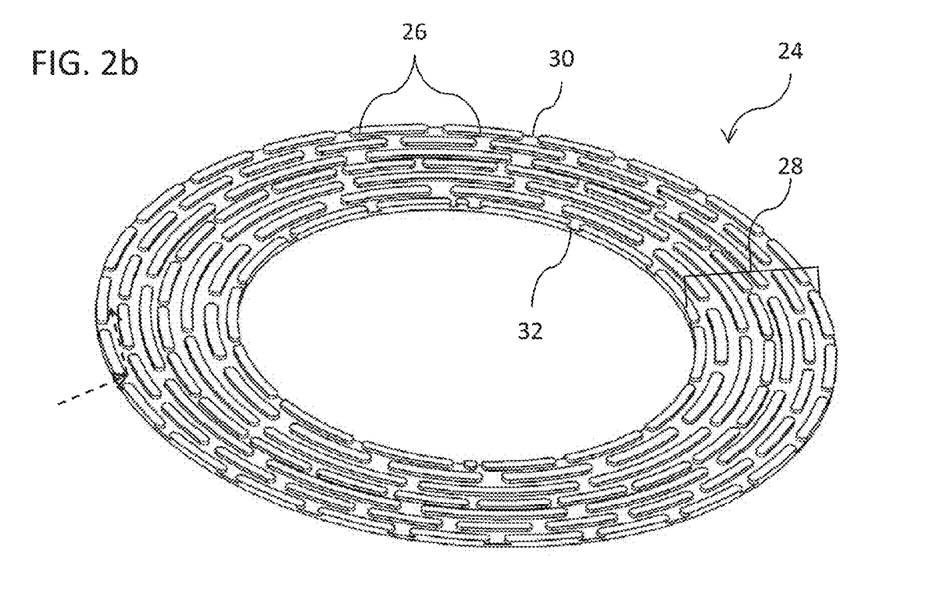
Figure 2C:
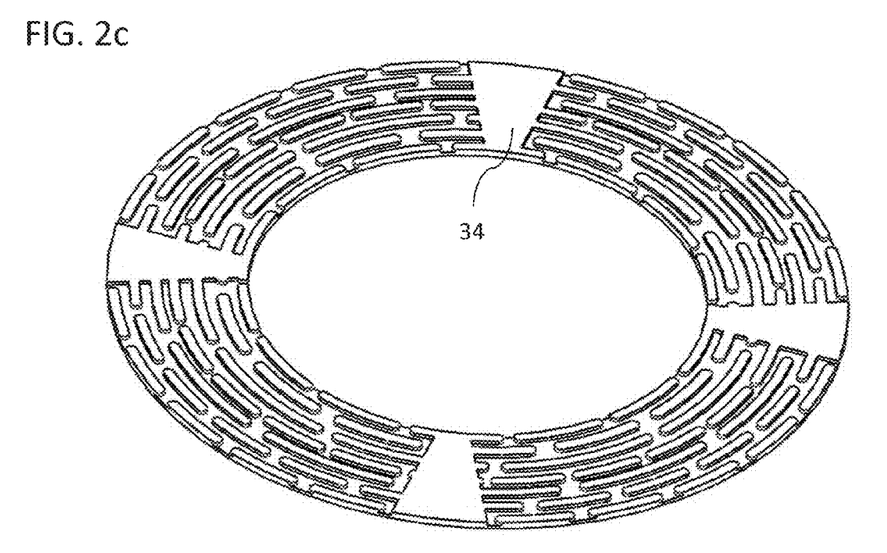

As shown in FIGS. 2a to 2d, the nature of the flow path can take many different configurations depending on the nature of the fluid flow to be controlled. For example, as shown in FIG. 2a an individual flow cage body (20) may incorporate a plurality of flow paths (22) formed of contiguous non-interconnecting flow channels. Alternatively, as shown in FIGS. 2b and 2c, the flow cage body (24) may incorporate a plurality of flow paths comprising an array of flow features (26) within the flow space (28) between the inlets (30) and outlets (32).

As further shown in FIGS. 2b and 2c, in embodiments incorporating flow paths formed from arrays of flow features (26), the flow paths may allow for fluid communication between all of the inlets and outlets in an open configuration (as shown in FIG. 2b), or the fluid paths between one or more inlet(s) and outlet(s) may be segregated by fluid barriers (34) in a closed or semi-closed configuration (as shown in FIG. 2c).

Figure 2D:
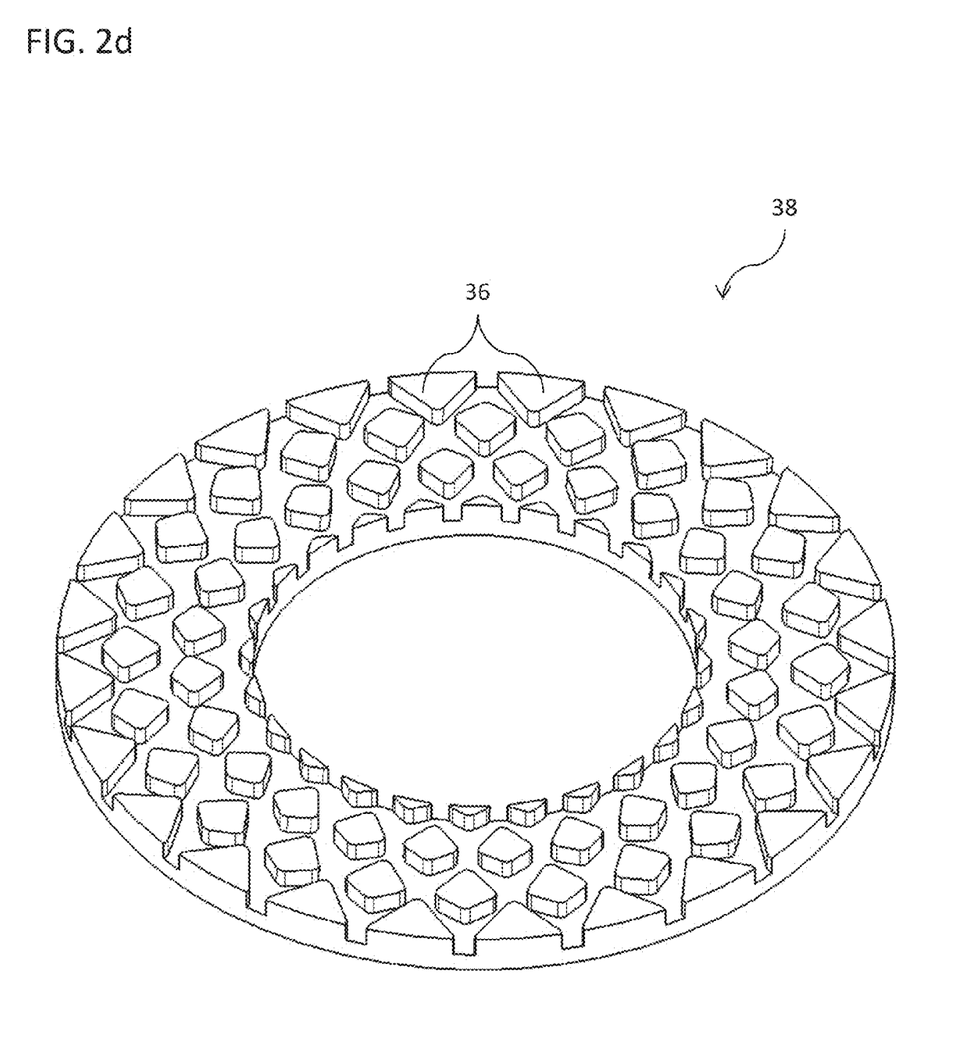

In addition, in embodiments incorporating flow paths formed from arrays of flow features, the flow features (36) of the flow cage body (38) may also incorporate variable shapes, geometries and arrangements, such as, for example, quadrilateral shapes, as shown in FIG. 2d. Although a quadrilateral shape is shown in the embodiment provided in FIG. 2d, it will be understood that any suitable shaped flow feature may be incorporated into the design, however, to improve manufacturability, in many embodiments the flow features are adapted not to include shapes that cannot be formed using conventional methods, such as, for example, lathe and milling, computer numerical control (CNC) or electric discharge machining (EDM). An example of a shape that does not generally allow for such conventional manufacturing would include generally circular shapes or features that are formed off center of the overall body of the object, such as off center ovoids and cylinders. Thus in many embodiments, the flow features are formed of angular bodies, which are defined herein as bodies having multiple faces and vertices, such as, for example, quadrilateral, triangular, hexagonal and octagonal bodies. Although non-circular shapes are generally used as flow features, it should be understood that in the context of this disclosure the term vertices may include corners and edges that have sharp or rounded corners.

Regardless of the specific design of the flow cage body, the disposition of the inlet and outlet, and the nature, geometry, etc. of the flow path and/or flow features, in many embodiments, the fluid flow path is configured to address problems associated with high pressure flow or high pressure differentials in fluid flow paths, such as, pressure surges, the formation of potentially erosive high pressure jets, and cavitation, among others by dissipating the energy of the fluid flow passing through the flow cage assembly, such as by reducing the pressure and/or velocity of the fluid flow.

Although many different types of fluid flow paths, incorporating different types of flow features are shown in FIGS. 2a to 2d, to address the problems associated with high pressure flows and high flow pressure differentials, particularly in the context of fluid valves placed into such a flow path, in many embodiments the fluid flow paths are adapted such that the energy of the fluid flow is dissipated during its passage through the fluid flow path. In many embodiments, such energy dissipation is accomplished by redirecting the flow within the flow cage to in a redirected direction that is at an angle to the original fluid flow direction one or more times such that the flow within the cage impinges on itself one or more times. Such flow impingement can reduce fluid momentum and thus energy concomitantly reducing the potential for high pressure jetting, cavitation, surge and the associated erosion. Some exemplary fluid path configurations, shown in FIGS. 2a to 2d, redirect the flow within a single plane from a radial to an azimuthal direction (see dashed arrows) one or more times, via, for example, a channel (such as the torturous path in the embodiment shown in FIG. 2a) or via a maze like array of flow features (such as the walls and quadrilateral features in the embodiments shown in FIGS. 2b to 2d). In each of these embodiments, the flow redirection is engineered into the flow cage body by providing one or more redirection flow channels within the flow paths that are arranged to direct the fluid in a flow direction that is different from, and at an angle to, the direction of the fluid flow being introduced into the flow path via the inlet. These redirection channels are then interconnected with each other via interconnecting channels, openings or gaps such that overall the flow path directs the fluid flow toward one or more outlets. Collectively the redirection and interconnecting channels form the fluid path.

Although the term 'channel' is used, it should be understood that the redirection channels and interconnecting channels may be formed of a single continuous channel (as shown in FIG. 2a), or an array of flow features (such as the walls in FIGS. 2b and 2c, or the isolated elements in FIG. 2d), or a combination thereof. In addition, although specific arrangements and geometries of flow paths are presented (like the torturous maze with the azimuthal meander in FIG. 2a), it should be understood that many other possible flow path geometries can be configured that accomplish equivalent fluid flow redirections, such as for example, a spiral, zig-zag, or other suitable configuration. Moreover, though the embodiments provided in FIGS. 2a to 2d all show an inlet where the fluid flow is radial with radially interconnected redirection channels that redirect the flow azimuthally, it should be understood that any combination of inlet flow direction, redirection channel flow direction and outlet flow direction may be combined in embodiments of the flow cages and flow cage assemblies such that the fluid flow is directed at an angle to the incoming inlet flow direction suitable to create an impinging flow, such as, for example, substantially orthogonal, azimuthal, etc.

As can be appreciated, the flow redirection configured in the flow path can also be accompanied by a related redirection of the outlet flow. For example, as shown in FIG. 2a, the inlet flow is radial and the outlet flow is azimuthal (see dashed arrows). Any such combination of relative inlet and outlet flow may be incorporated into embodiments of the flow cages and flow cage assemblies. Moreover, although the embodiments provided in FIGS. 2a to 2d all show cylindrical flow cage bodies in which the inlet and outlet are arranged in peripheral and inner bore walls of the cylinder of the flow cage body, it will be understood that the flow cage bodies may take any suitable geometry, and the flow paths could include inlets and outlets arranged entirely along the periphery (or in the case of a hollow body, like a cylinder, entirely along the inner bore wall of the body). For example, the main flow channels could be arranged in a non-concentric disposition, such as planar. In such an embodiment, the two main channel flow chambers or conduits could be separated by a wall with flat cages in the wall or tilted cages with the flow paths direct from one chamber to the other at a radial angle, such as 90 degrees. Accordingly, in such embodiments inlet and outlets may be interconnected such that the fluid flow is redirected from one radial direction to a second radial direction to provide fluid interconnection between the main flow channels, such as inlets and outlets arranged at 90 degrees to each other.

Finally, although in the embodiments shown each flow cage body shows a single inlet and outlet direction for all of the inlets and outlets, it will be understood that each of the inlets and outlets may comprise different inlet and outlet directions, and the fluid paths therebetween may also each be different. Included in such embodiments would be the use of different types of fluid paths, such as, for example some inlets and outlets being connected by single path channels, while others being connected via arrays of flow features, or combinations thereof.

Figure 3:
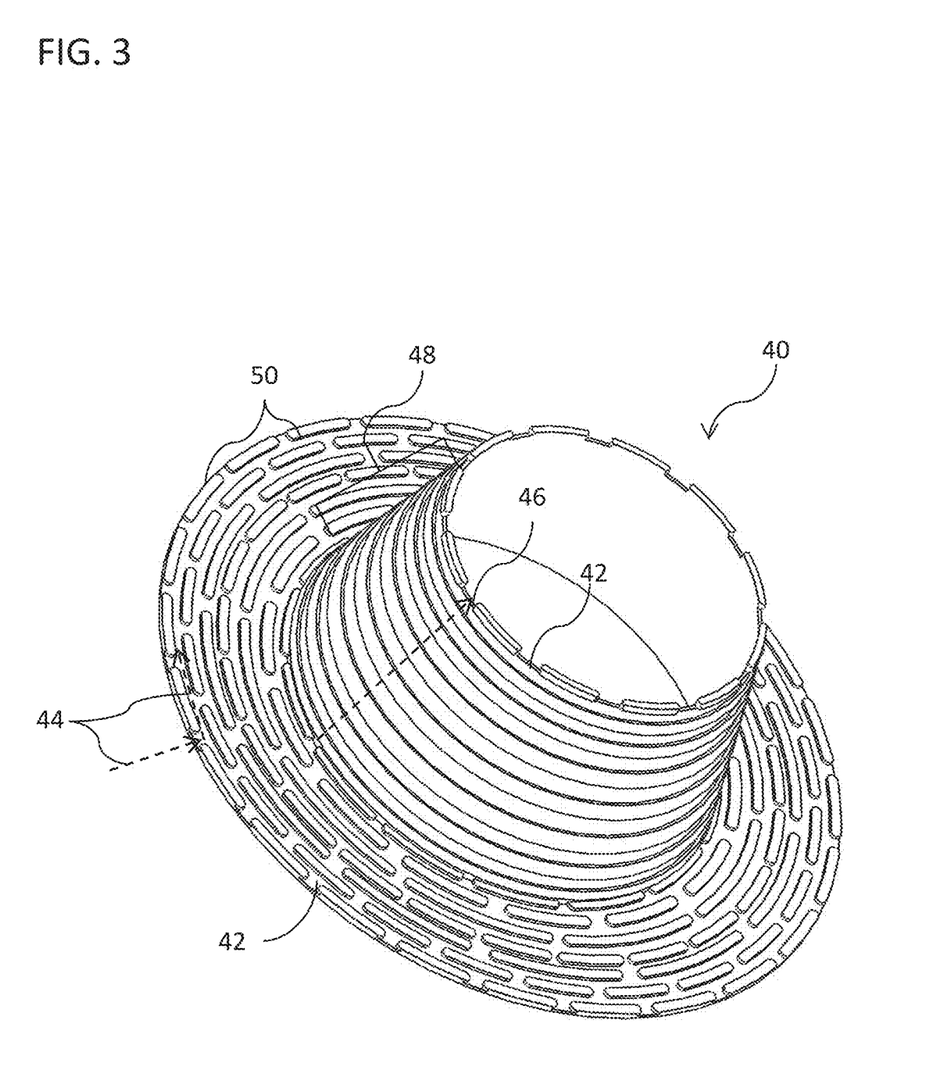
FIG. 3 provides a schematic diagram of a non-planar flow cage body in accordance with some embodiments of the invention.

Moreover, although the flow cage bodies shown in FIGS. 1 and 2 are all planar, thus restricting the flow paths to planar directions, it should be understood that non-planar flow cage bodies may also be incorporated into embodiments of the flow cage assemblies, thus allowing not only in-plane redirection of the fluid flow (such as an azimuthal or radial redirection of the fluid flow), but also an out-of-plane redirection of fluid flow (such as an axial redirection of the fluid flow), as shown in FIG. 3 (see dashed arrows). In such embodiments, the fluid cage body (40) may include a non-planar geometry in which the inlets and outlets (42) are out-of-plane in relation to each other. Such fluid cage bodies would then allow for fluid paths that are adapted to redirect the fluid flow in-plane (e.g., radially and azimuthally (44)), out-of-plane (e.g., axially (46)), and in directions intermediary thereto. Because such fluid cage bodies have regions (48) that are out-of-plane, it is also possible to increase the fluid path length beyond the length allowed solely by the radial dimension of the fluid flow cage, thereby increasing the length of the flow path and the number of redirections that can be arranged therein, thus further dissipating the energy of the fluid flow.

Although the embodiment shown in FIG. 3 illustrates a non-planar fluid cage body having a flow path formed of an array of wall features (50), it should be understood that such non-planar flow cage bodies may incorporate any suitable flow path geometry including contiguous torturous channels (such as are illustrated in FIG. 2a) or arrays of other isolated angular bodied flow features (such as are illustrated in FIG. 2d). In addition, although the embodiment provided in FIG. 3 shows a cylindrical flow cage body in which the inlet and outlet are arranged in peripheral and internal walls of the cylinder of the flow cage body, it will be understood that non-planar fluid flow cage bodies may take any suitable geometry, and the flow paths could include inlets and outlets arranged entirely along the periphery (or in the case of a hollow body, like a cylinder, entirely along the internal wall of the body), and such that the inlet and outlet flow directions may include redirection from one radial direction to a second, such as inlets and outlets arranged at 90 degrees to each other.

Finally, as described in relation to the planar flow cage bodies, the flow redirection configured in the flow path of non-planar flow cage bodies can also be accompanied by a related redirection of the outlet flow. For example, the inlet flow may be radial while the outlet flow is axial (as shown schematically in FIGS. 4a and 4b). Any such combination of relative inlet and outlet flows may be incorporated into embodiments of the flow cages and flow cage assemblies. Moreover, because it is possible in such non-planar flow cage bodies to direct a fluid low axially, it is also possible to introduce the fluid flow from the flow cage into the main channel either in-line with the direction of the main channel flow (as shown in FIG. 4a), or counter the direction of the main channel flow (as shown in FIG. 4b).

Figure 4A:
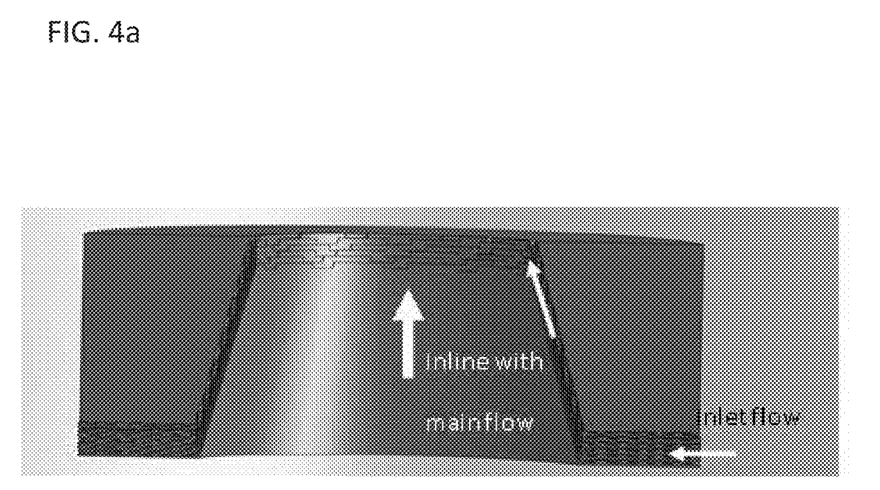
FIGS. 4a and 4b provide schematic diagrams of in-line and counter flow geometries utilizing a non-planar flow cage body in accordance with some embodiments of the invention.
Figure 4B:
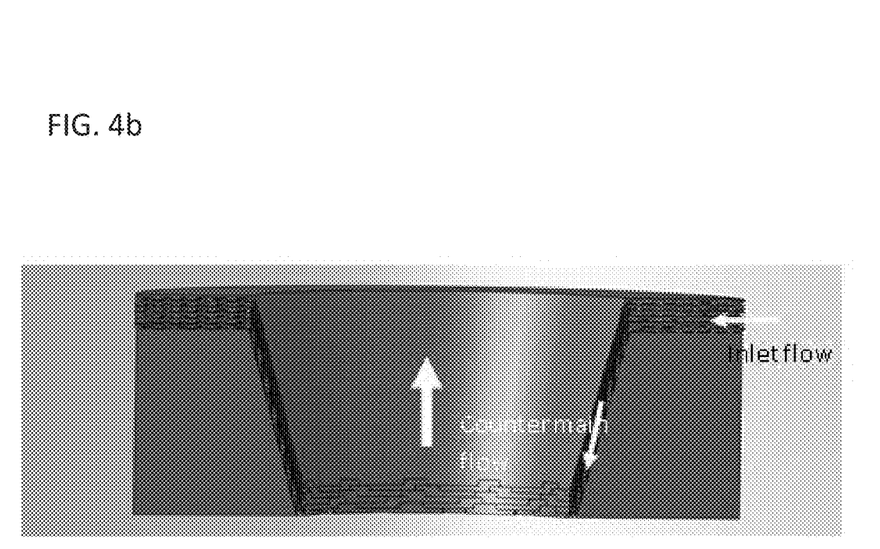
Figure 5A:
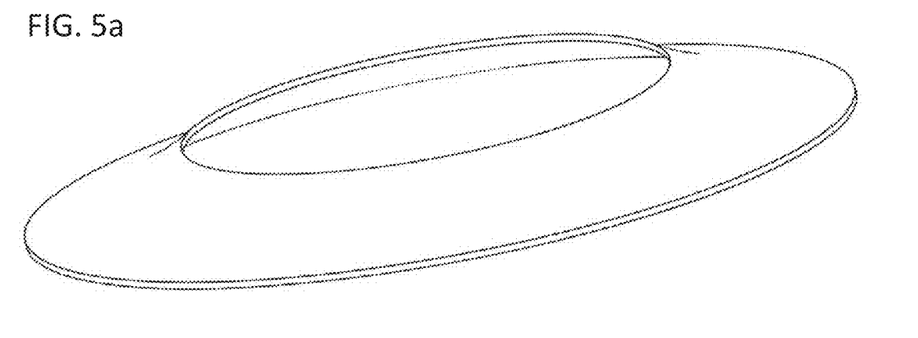
FIGS. 5a to 5c provide schematic diagrams of non-planar geometries for non-planar flow cage bodies in accordance with some embodiments of the invention.
Figure 5B:
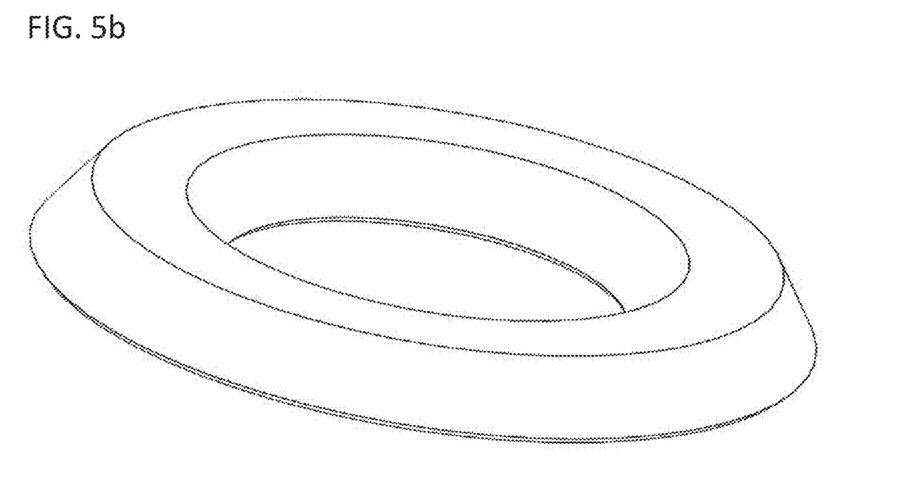
Figure 5C:
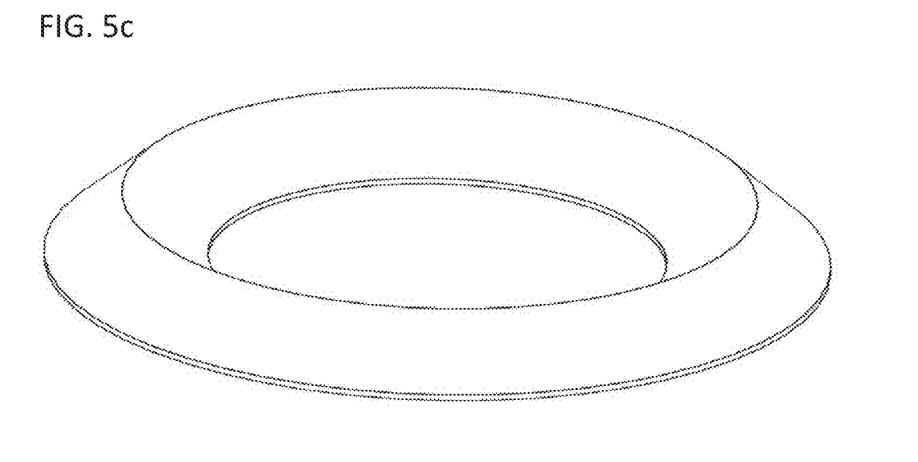

Although FIGS. 3 and 4 show generally conical non-planar flow cage bodies, it should be understood that a variety of non-planar disk shapes are apparent that can both increase the flow length and redirect the flow from the radial direction to the axial direction or the converse from the axial to the radial. Examples of some non-planar disk geometries in accordance with embodiments that can be stacked and have the functionality discussed in relation to FIGS. 3 and 4, are shown in FIGS. 5a to 5c. It should be understood that other non-planar geometries can be configured within the scope of the flow cages and flow cage assemblies, including other non-concentric geometries. Finally, although the flow paths are not shown in these schematics, it should be understood that any of the flow paths described herein may be incorporated into these flow cage bodies.

Figure 6A:
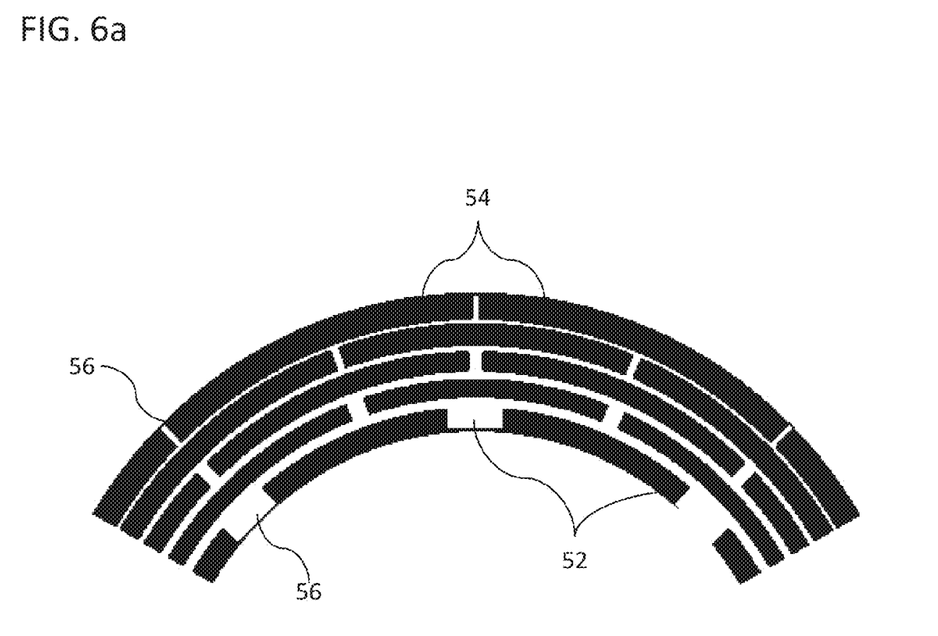
FIGS. 6a and 6b provide schematic and top view diagrams of flow cage bodies having flow paths with variable flow areas in accordance with some embodiments of the invention.
Figure 6B:
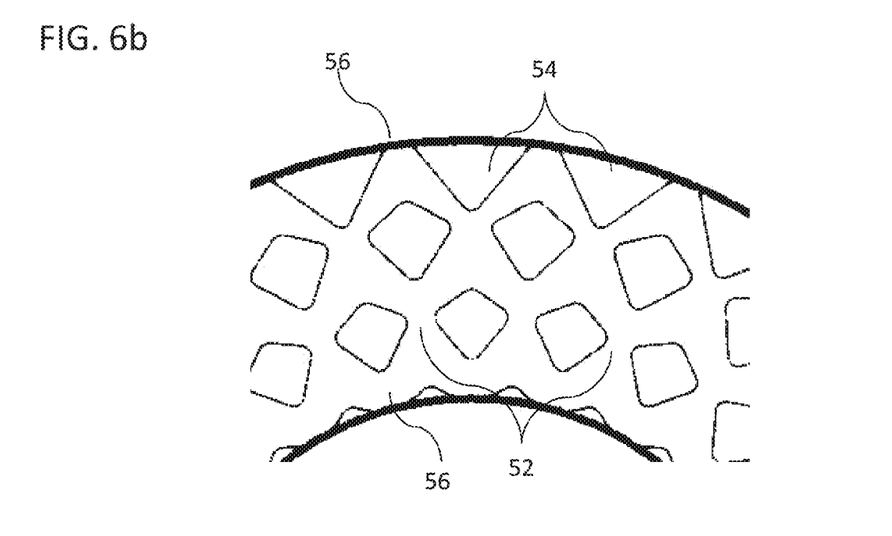

In addition to redirection of the fluid flow, in many embodiments the fluid flow cages and cage assemblies are configured to dissipate the energy of a fluid flow by constricting or dilating the flow volume of the flow bath in a controlled manner from the inlet of the flow cage body to the outlet. Exemplary embodiments of such volume variation along the flow path within the flow cage body are shown in FIGS. 6a and 6b. As shown, in these embodiments the spacing and size of the channels (52) and the flow features (54) are altered in a gradated manner to either constrict or dilate the flow path volume from the inlet to the outlet (56). Although these figures only show embodiments of such flow path volume control using arrays of flow features, it should be understood that such flow volume control may also be incorporated into continuous channels by increasing the channel dimensions (width and/or depth) to accomplish the same purpose.

Figure 7:
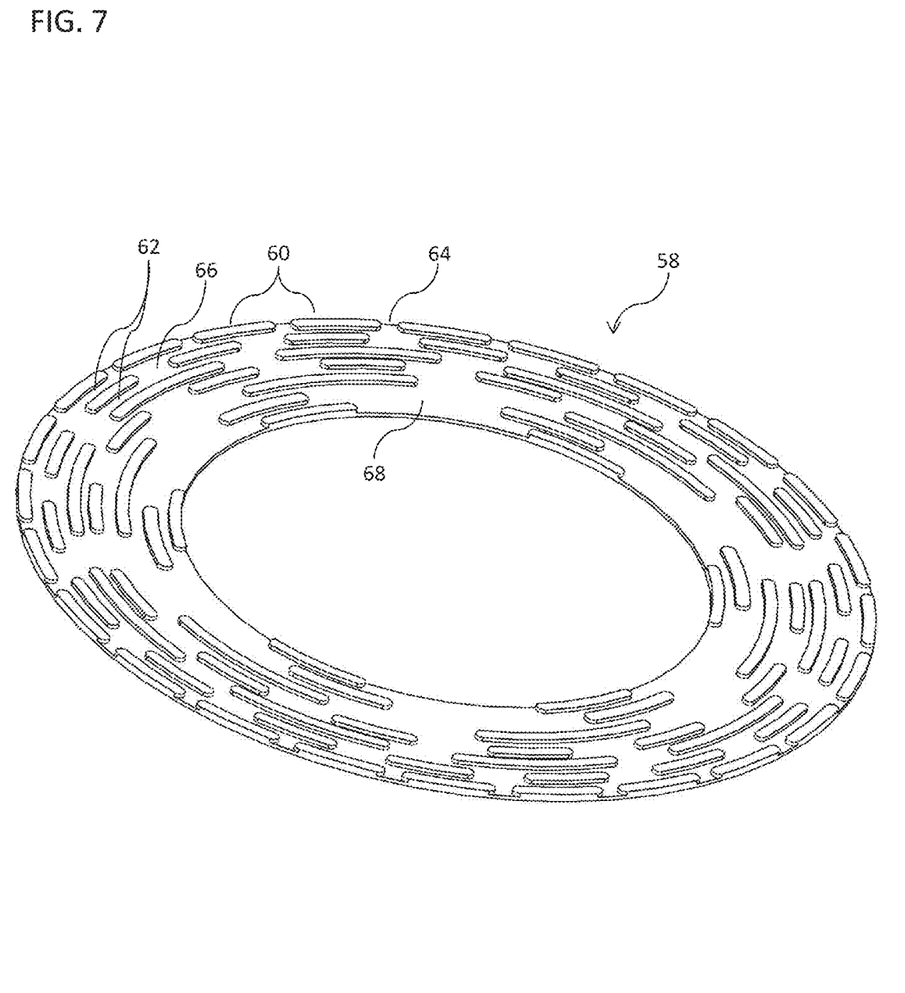
FIG. 7 provides a flow cage body incorporating multiple flow control elements in accordance with some embodiments of the invention.

Although some exemplary embodiments of flow paths configured to achieve one or more flow control objectives are provided in the figures discussed above, it should be understood that these possible configurations and remediations are only meant to be exemplary and other objectives may be achieved by manipulating the flow path or geometry and size of the flow features, such as, for example, by modifying the width of the channels, the number of the channels, the angular extent of each flow feature, the misalignment of openings between each flow feature, and the out of plane geometry. An exemplary embodiment of a flow cage body (58) that incorporates many of these control elements is provided in FIG. 7. In this embodiment, the flow cage body includes a flow path formed from an array of flow control features (60) that form redirection channels (62) that redirect the fluid flow from the incoming inlet (64) direction (in this case radial) to a second direction (in this case azimuthal). In addition, the interconnecting channels (66) that provide the communication between these redirection channels are offset and staggered to further impinge the incoming fluid flow. Finally the volume of the flow path increases in a gradated manner from the inlet (64) to the outlet (68). Although not shown, such a combination of features could be incorporated into non-planar flow cage bodies that could also incorporate redirection of the fluid path or outlet flow in an axial direction as well.

Figure 8A:
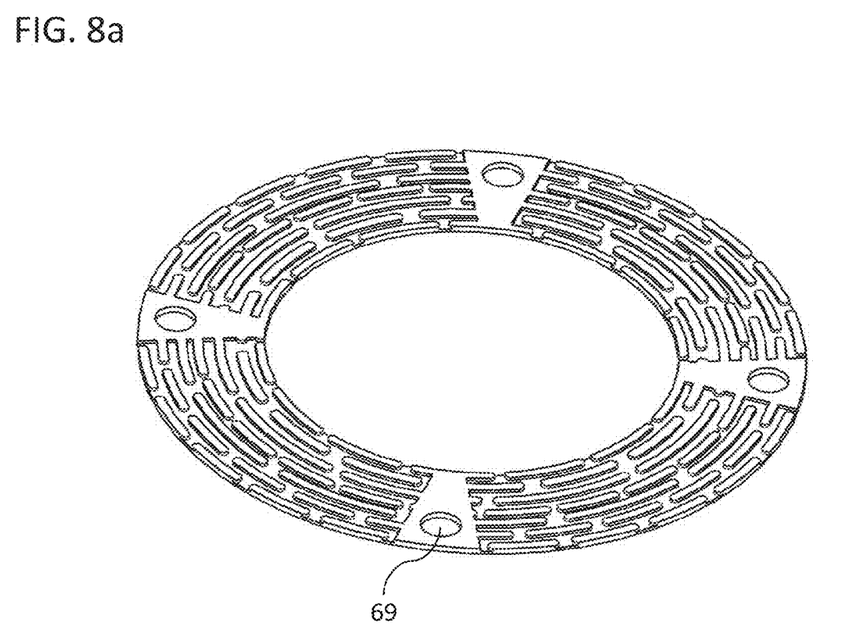
FIGS. 8a and 8b provide schematic diagrams of flow cage bodies having alignment/anchor holes in accordance with some embodiments of the invention.
Figure 8B:
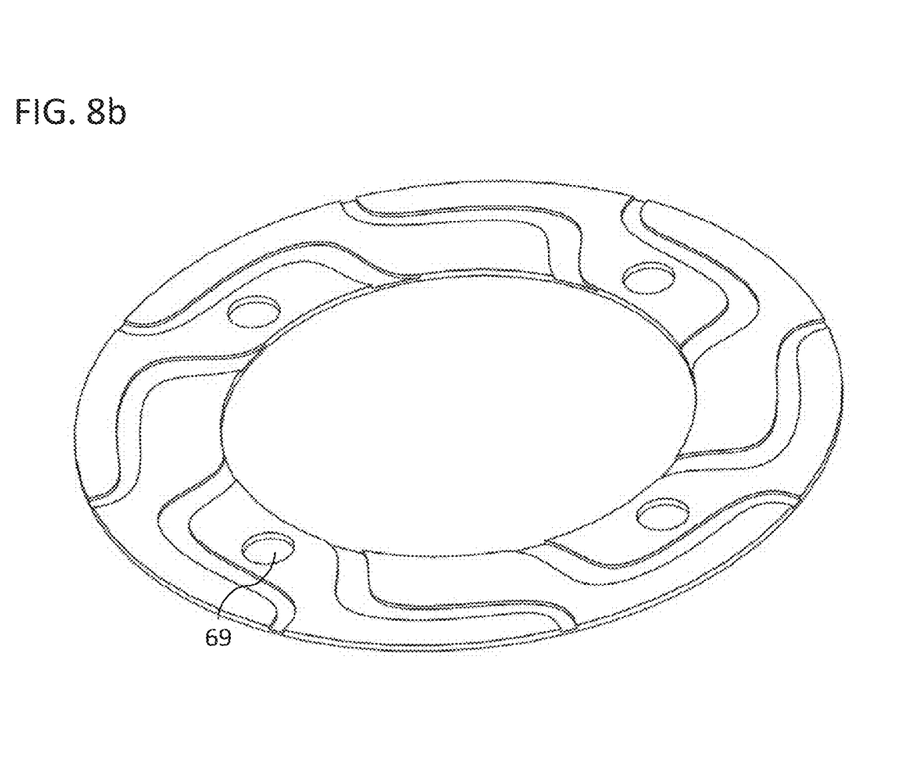

As discussed, all of the various flow cage bodes described herein may be adapted to be stacked cooperatively into a flow cage assembly. Although not required for the operation of the flow cage bodies or flow cage assemblies, in some embodiments, as shown in FIGS. 8a and 8b, the flow cage bodies may incorporate alignment and retention holes (69), such holes are adapted such that they may be aligned to insert an anchor therethrough to anchor the flow cage body to the surrounding fluid passage or valve, and in flow cage assemblies incorporating multiple flow cage bodies to maintain the placement of the flow cage bodies relative to each other. It should be understood that any number, placement, size or shape of alignment/retention hole may be incorporated into the flow cage bodies such that the holes do not fluidly interconnect with the flow path. Likewise, any suitable anchor may be used in association with the holes, including, for example, bolts, screws, pins, etc.

Embodiments are also directed to valves and valve assemblies incorporating flow cage bodies and flow cage assemblies as described herein. An embodiment of a valve incorporating a flow cage assembly, and the operation of that valve is shown schematically in FIGS. 9a and 9b. In this embodiment a sleeve valve (70) fluidly interconnecting two co-annular main flow channels (72 & 74) is provided. A flow cage assembly (76) comprising a plurality of flow cage bodies (78) is placed in the valve at the interconnection of the flow channels where the sleeve valve opening/gate (80) is disposed. As described in the embodiments above, each of the valve cage bodies has one or more fluid paths from the inlet (82) of the flow cage assembly (in this embodiment disposed in the outer wall of the flow cage body to the outlet (84) of the flow cage assembly (in this embodiment disposed in the inner wall/bore of the flow cage body). (Note, in this example we are assuming fluid flow from the outer channel to the inner channel as shown by the dashed arrows, the flow could be reversed without altering the operation of the valve.)

Figure 9A:
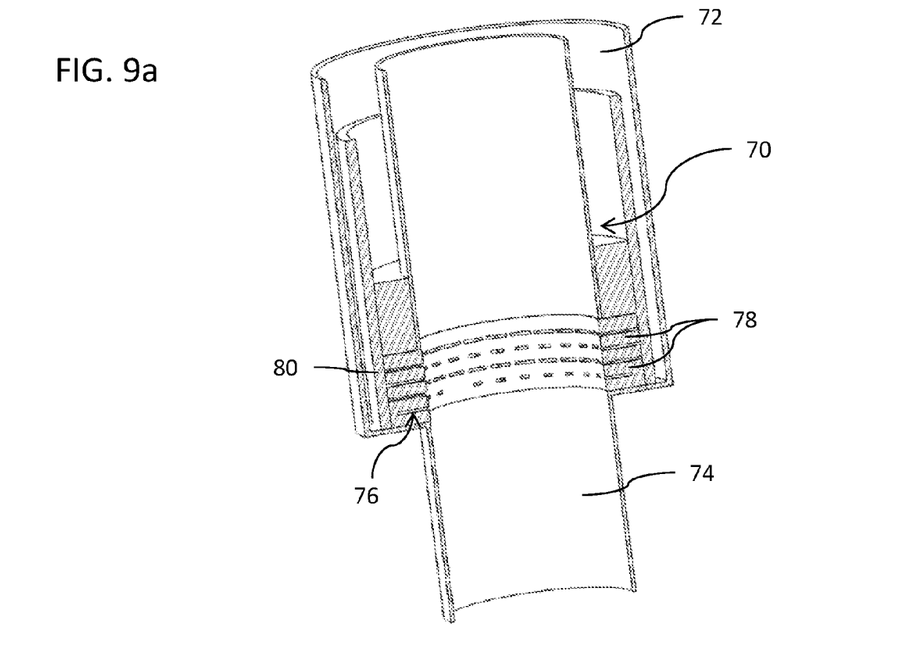
FIGS. 9a and 9b provide schematic diagrams of a valve incorporating a flow cage assembly in accordance with embodiments of the invention.
Figure 9B:
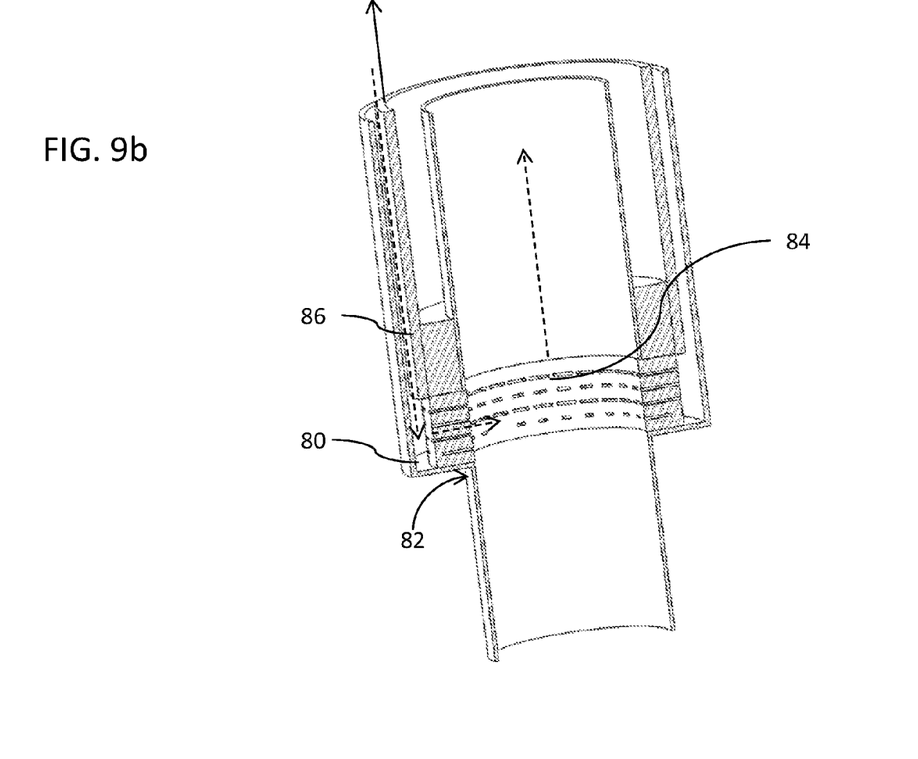

In this example, the sleeve valve has a valve gate (86) that moves up and down relative to the flow cage assembly (as shown by the solid arrow). (It should be understood that the flow cage assembly could be adapted for any gate geometry, such as, for example, a rotatable sleeve without altering the principals described herein). In this embodiment, as the sleeve gate (86) is lifted more of the inlets to the flow cage assembly are placed into fluid communication with the incoming fluid flow allowing for more and more flow channels to be available thus increasing the flow volume to the outlet channel.

Finally, although an exemplary flow cage assembly is shown, it should be understood that any of the flow cage bodies or flow cage assemblies contemplated herein could be incorporated in such a valve. In addition, although a single type of valve is shown it should be understood that the flow cage bodies and flow cage assemblies may be adapted for use with any valve type, including, for example, angle valves, globe valves, diaphragm valves, rotary valves, sliding cylinder valves, gate valves, etc. Finally, although the type of co-annular sleeve valve shown in the embodiment is principally used in downhole applications in oil and gas production, it will be understood that valves incorporating the flow cage bodies and flow cage assemblies described herein can be used for any suitable application, including, for example, pressurized tanks, engine combustion chambers, water handling, steam power applications, etc.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A flow cage assembly comprising:
    at least one flow cage body having a planar portion disposed along a first axis and a non-planar portion disposed along a second axis that is at an out-of-plane angle to said first axis, each at least one flow cage body having at least one inlet and at least one outlet, wherein the at least one outlet is configured to be within the non-planar portion, and defining at least one flow path therebetween, such that there is fluid communication through said flow cage body through the at least one flow path;
    wherein each of the at least one inlets defines a first fluid flow direction and each of the at least one outlets defines a second fluid flow direction, and each of the at least one flow paths is configured to redirect an incoming fluid flow in at least one redirected fluid flow direction that is angled to the first fluid flow direction at least once prior to interconnecting said incoming fluid flow to the outlet.

2. The flow cage assembly of claim 1, wherein the fluid flow is redirected at least in a redirected fluid flow direction that is out-of-plane with the first fluid flow direction.

3. The flow cage assembly of claim 1, wherein the flow path redirects the fluid flow at least in a first redirected fluid flow direction that is in-plane with the first fluid flow direction and in a second redirected fluid flow direction that is out-of-plane with the first fluid flow direction before interconnecting the incoming fluid flow to the outlet.

4. The flow cage assembly of claim 1, wherein the second fluid flow direction is in-line with an external fluid flow into which the at least one outlet communicates.

5. The flow cage assembly of claim 1, wherein the second fluid flow direction is counter to an external fluid flow into which the at least one outlet communicates.

6. The flow cage assembly of claim 1, comprising at least two inlets and a plurality of outlets, wherein each inlet is interconnected to said plurality of outlets.

7. The flow cage assembly of claim 1, comprising at least two flow cage bodies, the flow cage bodies being cooperatively stackable.

8. The flow cage assembly of claim 1, wherein the flow area of the at least one flow path is one of either constricted or dilated between the at least one inlet and the at least one outlet.

9. The flow cage assembly of claim 1, wherein the flow path is formed from at least one of the following, a single path channel or an array of angular body flow features, the angular body flow features having shapes having a plurality of faces and vertices selected from the group consisting of quadrilaterals, triangles, hexagons, and octagons.

10. A valve comprising:
    a valve body having a valve inlet in fluid communication with a first external fluid passage and a valve outlet in fluid communication with a second external fluid passage and a valve gate disposed therebetween for opening and closing the fluid communication therebetween;
    at least one flow cage assembly disposed in fluid communication with said valve body, the flow cage assembly comprising at least one flow cage body having a planar portion disposed along a first axis and a non-planar portion disposed along a second axis at an out-of-plane angle to said first axis, each at least one flow cage body having at least one inlet in fluid communication with the valve gate and at least one outlet, wherein the at least one outlet is configured to be within the non-planar portion and in fluid communication with the valve outlet, the flow cage body further defining at least one flow path between said at least one inlet and at least one outlet;
    wherein each of the at least one inlets defines a first fluid flow direction and each of the at least one outlets defines a second fluid flow direction, and each of the at least one flow paths is configured to redirect an incoming fluid flow in at least one redirected fluid flow direction that is angled to the first fluid flow direction at least once prior to interconnecting said incoming fluid flow to the outlet.

11. The valve of claim 10, wherein the fluid flow is redirected at least in a redirected fluid flow direction that is out-of-plane with the first fluid flow direction.

12. The valve of claim 10, wherein the flow path redirects the fluid flow at least in a first redirected fluid flow direction that is in-plane with the first fluid flow direction and in a second redirected fluid flow direction that is out-of-plane with the first fluid flow direction before interconnecting the incoming fluid flow to the outlet.

13. The valve of claim 10, wherein the second fluid flow direction is counter to the fluid flow direction in the second external fluid passage.

14. The valve of claim 10, wherein the flow cage assembly comprises at least two flow cage bodies, the flow cage bodies being cooperatively stackable.

15. The valve of claim 10, wherein the flow area of the at least one flow path is one of either constricted or dilated between the at least one inlet and the at least one outlet.

* * * * *